March 17, 1925.  R. D. EVANS  1,529,777
RELAY
Filed Oct. 17, 1918
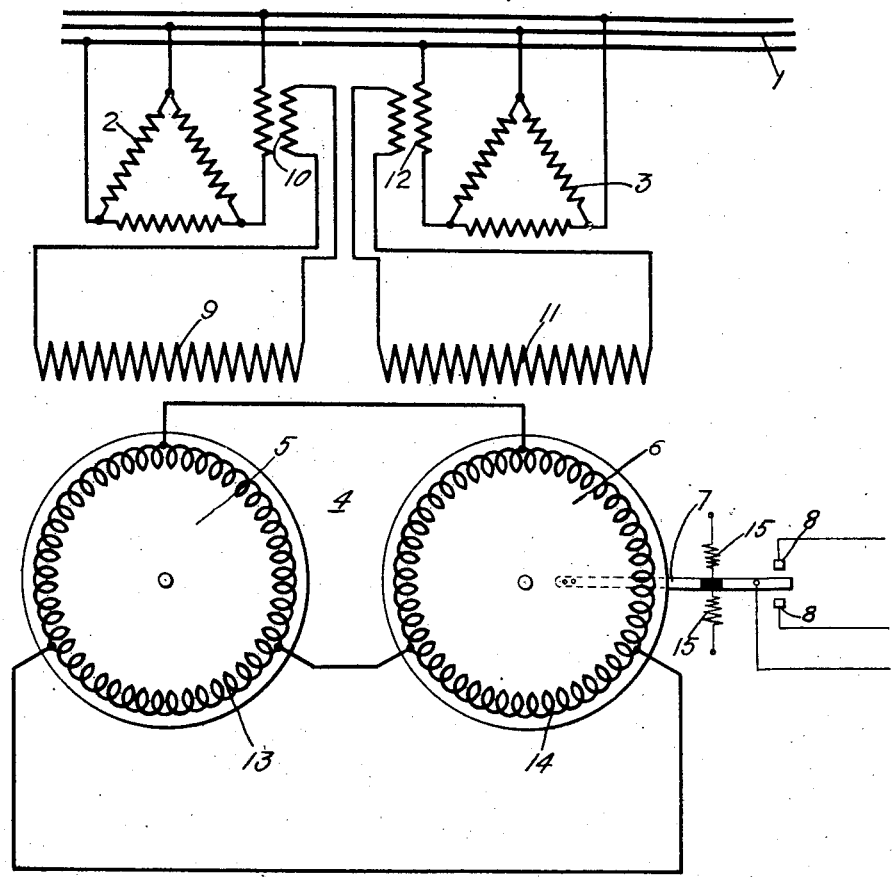
WITNESSES:
J. A. Abelsel.
JHProcter
INVENTOR
Robert D. Evans.
BY
Merley G Carr
ATTORNEY Patented Mar. 17, 1925.

1,529,777

UNITED STATES PATENT OFFICE.

ROBERT D. EVANS, OF WILKINSBURG, PENNSYLVANIA, ASSIGNOR TO WESTINGHOUSE ELECTRIC & MANUFACTURING COMPANY, A CORPORATION OF PENNSYLVANIA.

RELAY.

Application filed October 17, 1918. Serial No. 258,552.

*To all whom it may concern:*

Be it known that I, ROBERT D. EVANS, a citizen of the United States, and a resident of Wilkinsburg, in the county of Allegheny and State of Pennsylvania, have invented a new and useful Improvement in Relays, of which the following is a specification.

My invention relates to relays and particularly to phase-responsive relays.

One object of my invention is to provide a high-torque relay that shall be adapted to operate in accordance with the phase-angular relation of the currents traversing two electric circuits.

Another object of my invention is to provide a relay, of the above indicated character, that shall be simple and rugged in construction and effective in its operation.

In practicing my invention, I provide two induction motors severally having single-phase primary and polyphase secondary windings. The primary windings are operatively connected to the respective circuits, the phase-angular relation of the currents traversing which is to be determined, and the secondary windings are connected in closed-circuit relation with respect to each other. The rotor of one of the motors is locked stationary and the rotor of the other motor is provided with a movable contact member that is adapted to engage stationary contact members when the rotor is turned to thus indicate phase-relation or control apparatus in accordance with the phase-relation of the currents traversing the respective circuits. Since the rotor of one of the motors is stationary, when the phase-angular relation of the circuits is changed, the phase-angular relation of the currents in the secondary windings of the other motor will be shifted an amount in accordance with the change in phase-angular relation, and this current will co-operate with the current traversing the primary winding to cause the rotor having the contact member thereon to turn with a relatively high torque in the one or the other direction an amount proportional to the change in phase-angular relationship of the currents traversing the circuits.

The single figure of the accompanying drawing is a diagrammatic view of an electrical circuit illustrating the connections of a phase relay embodying my invention.

A three-phase electric circuit 1 is adapted to supply energy to the primary windings of two induction motors 2 and 3. If the two induction motors are used to operate a single railway locomotive, it has been determined that, when they operate at the same speed, the losses will be a minimum. When the slip of such motors changes, the reactance of the same changes, and thus the phase relation of the currents traversing the same changes. In view of the above, I provide a rugged high-torque phase relay 4 that is responsive to the phase relation of the currents traversing the motors for so controlling the same that the speeds remain the same, and, consequently, they may operate at a maximum efficiency.

The phase relay 4 comprises two induction motors 5 and 6, the secondary member of the motor 5 of which is stationary and the corresponding member of the motor 6 is provided with a movable contact member 7 that is adapted to engage stationary contact members 8 for the purpose of controlling the resistance in the secondary winding (not shown) of the motors 2 and 3. The motor 5 is provided with a single-phase primary winding 9 that is connected, through a transformer 10, to the circuit of the motor 2. Similarly, the motor 6 is provided with a single-phase primary winding 11 that is connected, through a transformer 12, to the circuit of the motor 3. The motors 5 and 6 are provided with polyphase secondary windings 13 and 14 that are connected in closed-circuit delta-delta relation with respect to each other. The motor 5 may be assumed to be a static transformer as it is locked stationary.

When the currents traversing the circuits of the motors 2 and 3 are in phase, the secondary member of the motor 6 will be maintained in the position shown in the drawings by springs 15. However, if the phase-angular relation of the currents in the circuits of the motors 2 and 3 changes by reason of a difference in slip in the same, the current traversing the winding 14 of the motor 6 will be shifted an amount electrically proportionate to the change in the phase relation because the secondary member of the motor 5 is stationary. When the phase relation of the current traversing the winding 14 is shifted, this current co-operates with the current traversing the primary winding 11 to cause the movable contact member 7 to be moved with a relatively great torque into engagement with the one or the other of the contact members 8, in accordance with the change in phase-angular relation between the currents traversing the motors 2 and 3. Similarly, when the current traversing the motor 3 advances, the current traversing the winding 11 will advance and will co-operate with the current traversing the winding 14 to actuate the contact member 7. In other words, the phase relation of the currents in the windings 11 and 14 will vary in accordance with the phase relation of the currents traversing the circuits.

My invention is not limited to the particular application or structures illustrated, as it may be variously modified without departing from the spirit and scope of the invention, as set forth in the appended claims.

I claim as my invention:

1. A phase relay for indicating and controlling the phase relation between the currents traversing two separate circuits comprising two translating devices one of which has a stationary and the other a movable secondary member, said devices having single-phase primary windings adapted to be respectively energized from the circuits, and polyphase secondary windings, and means for connecting the secondary windings together.

2. A phase relay for indicating and controlling the phase relation between the currents traversing two separate circuits comprising two translating devices one of which has a stationary and the other a movable secondary member, said devices having single-phase primary windings adapted to be severally energized from the respective circuits and polyphase secondary windings, and means for connecting the secondary windings in delta-delta relation to each other.

3. A phase relay comprising a translating device having a non-rotatable armature, a second translating device having a movable armature, single-phase primary windings for the devices adapted to be connected to the respective circuits, the phase relations of the currents traversing which is desired, and polyphase secondary windings connected in closed-circuit relation with respect to each other.

4. A phase relay comprising an induction motor having primary and secondary windings, the primary winding of which is adapted to be connected to one circuit the phase relation of the current traversing which with respect to that traversing another circuit is desired, and converting means the primary winding of which is connected to the other circuit and the secondary windings of which are connected to the secondary windings of the motor.

5. The combination with two electric circuits, of an induction motor having a polyphase secondary winding and a single-phase primary winding that is connected to one of the circuits, and a converting device having a single-phase primary winding connected to the other circuit and a polyphase secondary winding connected to the secondary winding of the motor.

6. The combination with two electric circuits, of two translating devices having single-phase primary windings that are connected to the respective electric circuits, polyphase secondary windings that are connected in closed-circuit relation with respect to each other, and means controlled by one of said secondary windings for indicating the phase relation between the currents traversing the primary windings.

7. The combination with two electric circuits, of two translating devices having single-phase primary windings that are connected to the respective electric circuits and three-phase secondary windings that are operatively connected together, and an indicator controlled by one of the secondary windings.

8. The combination with two electric circuits, of two translating devices having single-phase primary windings that are connected to the respective electric circuits and polyphase secondary windings that are connected in closed-circuit relation with respect to each other, and means responsive to the electrical relation of the currents traversing the secondary windings for controlling one of the circuits.

9. The combination with two electric circuits, of two translating devices having single-phase primary windings that are connected to the respective electric circuits and polyphase secondary windings that are connected in closed-circuit relation with respect to each other, and means actuated by one of said translating devices for controlling one of the circuits.

10. The combination with two electric circuits, of two translating devices having single-phase primary windings that are connected to the respective electric circuits and polyphase secondary windings that are connected in closed-circuit relation with respect to each other, and means actuated by one of said translating devices in accordance with a variation of the relation between the currents traversing the windings from a predetermined relation.

In testimony whereof, I have hereunto subscribed my name this 25th day of Sept., 1918.

ROBERT D. EVANS.